United States Patent [19]

Fischer et al.

[11] Patent Number: 5,759,485
[45] Date of Patent: Jun. 2, 1998

[54] WATER SOLUBLE CORROSION INHIBITORS

[75] Inventors: Eugene R. Fischer, Charleston; Paul G. Boyd, Moncks Corner, both of S.C.

[73] Assignee: Westvaco Corporation, New York, N.Y.

[21] Appl. No.: 854,421

[22] Filed: May 12, 1997

[51] Int. Cl.$^6$ .................................................. C23F 11/12
[52] U.S. Cl. .................................................. 422/16
[58] Field of Search .............................. 422/7, 16, 17; 560/127; 562/509; 252/392, 390; 507/939, 241, 244

[56] References Cited

U.S. PATENT DOCUMENTS

| | | |
|---|---|---|
| 2,188,882 | 1/1940 | Clocker. |
| 2,275,843 | 3/1942 | Clocker. |
| 2,756,210 | 7/1956 | Raifsnider. |
| 2,948,598 | 8/1960 | Brehm. |
| 3,919,453 | 11/1975 | Bussell. |
| 4,179,457 | 12/1979 | Crawford. |
| 4,505,954 | 3/1985 | Hokamura et al.. |
| 4,508,767 | 4/1985 | Hokamura et al.. |
| 4,514,445 | 4/1985 | Hokamura et al.. |
| 4,517,110 | 5/1985 | Suzuki et al.. |
| 4,927,669 | 5/1990 | Knox et al.. |
| 5,174,913 | 12/1992 | Alford et al.. |
| 5,292,480 | 3/1994 | Fischer et al.. |

FOREIGN PATENT DOCUMENTS 785474  10/1957  United Kingdom.

OTHER PUBLICATIONS

*Advanced Organic Chemistry, Reactions, Mechanism and Structure*, Mar. (2nd ed. 1977), pp. 726 and 761–766.

*Primary Examiner*—Timothy McMahon
*Attorney, Agent, or Firm*—Daniel B. Reece, IV; Terry B. McDaniel; Richard L. Schmalz

[57] ABSTRACT

This invention relates to water-soluble corrosion inhibiting compositions and the method of making the same. Specifically, this invention relates to inhibiting the corrosion of metals, particularly those employed in the production, processing, and transportation of petrochemical products. These water-soluble corrosion inhibiting compositions are created by neutralizing a $C_{22}$ tricarboxylic acid with aminoethylethanolamine and a member selected from the group consisting of imidazoline, amidoamine, and combinations thereof. The resulting compositions exhibit excellent film persistency characteristics even when utilized in small amounts.

11 Claims, No Drawings

WATER SOLUBLE CORROSION INHIBITORS

FIELD OF INVENTION

This invention relates to water-soluble corrosion inhibiting compositions. These compositions are exceptionally useful for inhibiting the corrosion of metals utilized in the production, processing, and transportation of petrochemical products (particularly where water is either introduced into, or contaminates, hydrocarbon fluids). Water can be a major problem, as its presence establishes the environment for metal corrosion. It is, therefore, often necessary to add a suitable agent to the oil/water medium to effectively reduce or eliminate problems which are associated with corrosion of metallic parts. Failure to do so can result in extensive corrosion of metal in the field, thereby leading to expensive repair and lost productivity.

BACKGROUND OF THE INVENTION

The oil industry has traditionally employed oil-soluble dimer/trimer acid based corrosion inhibitors to reduce corrosion in oil well piping. These inhibiting formulations commonly consist of materials which are produced by the thermal condensation of functionalized $C_{18}$ fatty acids (containing one or two double bonds, e.g., oleic and linoleic, respectively). Examples of well-known methods by which the thermal polymerization of fatty acids occur include heating an appropriate fatty acid mixture (e.g., tall oil fatty acid or soya fatty acid) in the presence of a clay or other suitable catalyst to give varying amounts of $C_{36}$ (dimerized) and $C_{54}$ (trimerized) fatty acids. These dimer and/or trimer fatty acids are neutralized with an appropriate amine to produce a corrosion inhibitor. These inhibitors are oil-soluble with minimum water dispersibility and act by coating metal surfaces (via adsorption by polar groups), thereby excluding the water which is necessary for the corrosion process to occur.

These type of compounds are described in U.S. Pat. No. 4,927,669 to Knox et al. (which is hereby incorporated by reference). This patent taught the reaction of maleic anhydride or fumaric acid with tall oil fatty acids, neutralized with an appropriate amine, to produce oil-soluble corrosion inhibitors.

However, over the past few years several factors have caused the oil industry to reevaluate its traditional preference for oil-soluble water-dispersible corrosion inhibitors. Many oil wells now produce mixtures higher in water content than in oil. Efficiency could be improved by utilizing the majority fluid in these wells as the carrier for the inhibitor. Also, water (and dissolved earth minerals) is the medium which causes electrochemical corrosion in oil and gas pipelines. If one could effectively disrupt the corrosion cycle at its source, one would have a more effective inhibitor. Finally, the carrier solvent constitutes about 70% of a standard corrosion inhibitor package. Replacing the traditional heavy aromatic napthas and other hydrocarbon solvents with water would eliminate the environmental damage caused by using hydrocarbon solvents—while also reducing costs.

Thus, the trend in the oil industry has been to switch from oil-soluble delivery systems for corrosion inhibitors to water-soluble delivery systems. This is evidenced by the increasing number of companies which require corrosion inhibitors to be evaluated via linear polarization resistance meters (which test for inhibition in pure aqueous systems rather than the traditional hydrocarbon/aqueous systems).

In order to increase their water-dispersibility, conventional oil-soluble dimer/trimer mixtures have been co-formulated with both fatty acid imidazolines and a variety of surfactants. However, this approach has proven limited in its scope. The use of enough surfactant to render the dimer/trimer molecule water-soluble results in drastically reduced film formation and film persistency. That is, the corrosion inhibitor simply washes-off the metal, leaving it unprotected. Also, these highly surfacted packages have a tendency to emulsify under downhole conditions, resulting in major problems for the user.

These problems were addressed in U.S. Pat. No. 5,174,913 to Alford et al. and in U.S. Pat. No. 5,292,480 to Fischer et al. (which are hereby incorporated by reference). Both of these patents taught the production of highly water dispersible corrosion inhibitors. The corrosion inhibitors taught in U.S. Pat. Nos. 5,174,913 are based upon the use of partial esters of polybasic acids; while those taught in U.S. Pat. No. 5,292,480 are based upon the utilization of partial polyol esterification with the partial salting of maleated fatty acids.

However, as oil wells continue to age the produced fluids composition changes from predominantly hydrocarbons to hydrocarbon/acid brine mixtures to predominantly brine with lower hydrocarbon yields. Indeed, today more such older wells are now in production than the number of new wells. These high acid brine mixtures also adversely affect the transportation pipelines by establishing more corrosive environments. Moreover, pipelines are currently being subjected to increasing corrosion stresses caused by multiple product transportation, empty periods for product changeover, and low (i.e., not full) flows of products through the pipelines.

Therefore, there exists a major need in the industry for corrosion inhibitors which are totally water-soluble and which have the ability to impart excellent film persistency. Water-soluble corrosion inhibitors which are currently available include alkyl pyridine quaternary compounds (generally benzyl quats), imidazoline salts (with acetic acid), and imidazoline ethoxylates. Although these inhibitors have found some limited use in oil and gas pipelines, they have not yet proven tenacious enough to successfully inhibit corrosion under a number of commonly encountered conditions. Furthermore, these inhibitors are low-performance compounds in that they must be employed in high dosages (i.e., commonly from 50 parts to 100 parts per million) when utilized as continuous-treatment additives for inhibiting corrosion.

It is the object of this invention to provide effective high-performance water-soluble corrosion inhibitors capable of being utilized as either batch-treatment additives or as continuous-treatment additives. Other objects, features, and advantages will be evident from the following disclosures.

SUMMARY OF THE INVENTION

The object of this invention is met by reacting one or more $C_{18}$ unsaturated fatty acids with a member selected from the group consisting of maleic anhydride, fumaric acid, and combinations thereof to produce a $C_{22}$ tricarboxylic acid. The $C_{22}$ tricarboxylic acid is subsequently reacted with aminoethylethanolamine and a combination selected from the group consisting of imidazoline, amidoamine, and combinations thereof to produce the corrosion-inhibiting compound.

These corrosion-inhibiting compounds are water-soluble and quickly form films which impart improved corrosion inhibition (i.e., film persistency) over the current standard industry water-soluble corrosion inhibiting formulations. Moreover, the dosage required to provide the industry standard of 90% corrosion protection or greater is significantly reduced.

DESCRIPTION OF THE PREFERRED EMBODIMENT

To produce the versatile corrosion-inhibiting compounds, one first reacts one or more $C_{18}$ unsaturated fatty acids with a member selected from the group consisting of maleic anhydride, fumaric acid, and combinations. Where maleic anhydride is utilized, it is necessary to react the resulting acid anhydride product (i.e., fatty acid Diels-Alder adducts, fatty acid-ene reaction products, and mixtures thereof) with water to form the $C_{22}$ tricarboxylic acid. That is, the carboxylic acid functionality of the acid anhydride is increased by reacting it with water to form a hydrolyzed acid anhydride (the $C_{22}$ tricarboxylic acid) having the following chemical structure:

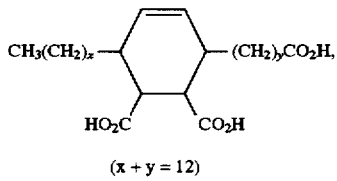

$(x + y = 12)$

However, the reaction of the $C_{18}$ unsaturated fatty acids with fumaric acid directly forms the $C_{22}$ tricarboxylic acid (thus no hydrolyzation reaction is necessary). Both of these reactions are well-known and are described in U.S. Pat. No. 4,927,669 to Knox et al.

The $C_{22}$ tricarboxylic acid is subsequently neutralized with a combination of aminoethylethanolamine (AEEA) and a member selected from the group consisting of imidazoline, amidoamine, and combinations thereof to produce the corrosion inhibiting compounds. For example, partial neutralization of the $C_{22}$ tricarboxylic acid with AEEA (also known as hydroxyethylethylenediamine or $NH_2CH_2CH_2NHCH_2CH_2OH$) produces water-soluble molecules with the following chemical structures:

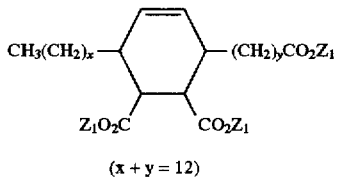

$(x + y = 12)$ where; $Z_1$ = H or H (AEEA).

The remaining free carboxylic acids are neutralized with a member selected from the group consisting of imidazoline, amidoamine, and combinations thereof to produce the corrosion inhibiting compounds with the following chemical structures:

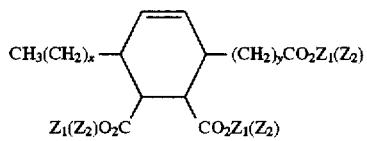

$(x + y = 12)$ where;

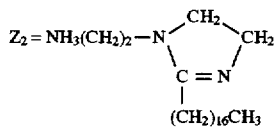

Imidazoline or

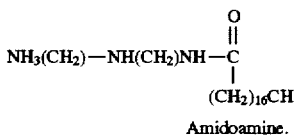

Amidoamine.

The order of neutralization of the $C_{22}$ tricarboxylic acid (i.e., the hydrolyzed acid anhydride) with AEEA, and a member selected from the group consisting of imidazoline, amidoamine, and combinations thereof is not critical. If desired, the $C_{22}$ tricarboxylic acid can be neutralized with all three reactants simultaneously.

Any of the basic oils containing a significant amount of $C_{18}$ unsaturated fatty acids is a suitable starting material for the present method including: corn oil, cottonseed oil, lard, linseed oil, mustard seed oil, olive oil, palm oil, peanut oil, rapeseed oil, rice bran oil, safflower oil, sesame oil, sunflower oil, tallow, whale oil, and the like. The preferred starting material is tall oil fatty acid.

While the $C_{18}$ unsaturated fatty acids can be reacted with a member selected from the group consisting of maleic anhydride, fumaric acid, and combinations thereof, it is preferred to utilize maleic anhydride to produce the $C_{22}$ tricarboxylic acid.

It is time consuming and expensive to separate imidazoline and amidoamine in order to produce pure imidazoline and pure amidoamine. Thus, when these compounds are employed in industry it is common to utilize mixtures of these two compounds. Indeed, the conventional industry nomenclature is to refer to commercially available mixtures of imidazoline and amidoamine as "imidazoline". Therefore, to avoid confusion (and unless noted otherwise) the subsequent use of the term "imidazoline" in this specification will be understood to mean a member selected from the group consisting of imidazoline, amidoamine, and combinations thereof.

Ratios which are suitable for use in producing the water-soluble corrosion-inhibiting compounds are 100.00 parts (by weight of the reactants in the neutralization reaction) of the $C_{22}$ tricarboxylic acid, to 6.00–60.00 parts of AEEA, to 13.0 to 175.0 parts of imidazoline.

The actual amounts of AEEA, imidazoline, and amidoamine required to totally neutralize the $C_{22}$ tricarboxylic acid are determined by acid numbers and the relative amine values of the reactants. In the present method it is suitable to neutralize from 90.0% to 10.0% of the $C_{22}$ tricarboxylic acid molecule with AEEA, and the remaining 10.0% to 90.0% of the $C_{22}$ tricarboxylic acid molecule with imidazoline. It is preferred to neutralize from about 80.0% to about 60.0% of the $C_{22}$ tricarboxylic acid molecule with AEEA, and the remaining 20.0% to 40.0% of the $C_{22}$ tricarboxylic acid molecule with imidazoline.

A preferred source of imidazoline and amidoamine which is suitable for use in the present method are fatty acid/diethylenetriamine condensates which contain from about 80.0% to about 50.0% imidazoline and from about 20.0% to about 50.0% amidoamine. More preferred fatty acid/diethylenetriamine condensates contain from about 65.0% to about 55.0% imidazoline and from about 35.0% to about 45.0% amidoamine.

To summarize, the novel water-soluble corrosion inhibiting compositions have the chemical structures

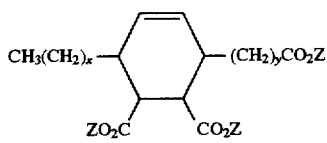

where: a) x+y=12; and
b) Z is a neutralizing base selected from the group consisting of aminoethylethanolamine, imidazoline, amidoamine, and combinations thereof; wherein:
1) from 90.0% to 10.0% of the acid functionality of the $C_{22}$ tricarboxylic acid is neutralzed by the $NH_2CH_2CH_2NHCH_2CH_2OH$ portion of Z; and
2) from 10.0% to 90.0% of the acid functionality of the $C_{22}$ tricarboxylic acid is neutralzed by the a member selected from the group consisting of

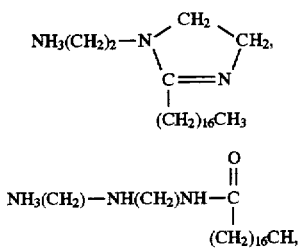

and combinations thereof.

If desired, the present water-soluble corrosion inhibiting compositions may be dispersed in a carrier solvent to facilitate the coating of metals. Suitable carrier solvents include, but are not limited to, the following: water, alcohol, and combinations thereof.

The following examples are provided to further illustrate the present invention and are not to be construed as limiting the invention in any manner.

EXAMPLE 1

A water-soluble corrosion inhibitor was produced via the following method. To a clean reactor was charged 95.0% (by weight of the hydrolyzation reactants) of TENAX 2010 (a maleated tall oil commercially available from Westvaco Corporation) which had been heated to 70° C. To the TENAX 2010 was added (with agitation) 5.0% (by weight of the hydrolyzation reactants) of deionized water. The resulting mixture was held at a temperature of 70° C. for three hours to produce a hydrolyzed acid anhydride ($C_{22}$ tricarboxylic acid).

To a clean reactor was charged 51.7% (by total weight of the neutralization reactants) of the hydrolyzed acid anhydride (which had been maintained at a temperature of 70° C.). To the acid anhydride was added, with agitation, 25.1% (by total weight of the neutralization reactants) of aminoethylethanolamine (AEEA). The resulting mixture was agitated for one hour. During this step the temperature of the exothermic reaction was carefully monitored and not allowed to exceed 100° C. (thereby preventing dehydration).

After this step a charge of 100.0% (by total weight of the neutralization reactants) of deionized water was added to the reactor, and the resulting mixture was continuously agitated for two hours. It should be noted that this water is not reactive in the neutralization reaction, and was added solely to modify the viscosity of the final water-soluble corrosion inhibiting composition and to dilute the composition to a 50% level (thereby generating the formulation tested in Examples 3 and 4 below). Either alcohols or alcohol/water mixtures can also be utilized, if desired, to adjust the viscosity of the final water-soluble corrosion inhibiting composition. However, the composition can be produced and utilized without the use of a dilutant.

After this period, a charge of 23.2% (by total weight of the neutralization reactants) of WMX-57F imidazoline (a tall oil fatty acid/diethylenetriamine condensate consisting of imidazoline and amidoamine commercially available from Westvaco Corporation) was added to the reactor. The resulting mixture was agitated for one hour to produce a formulation (hereafter referred to as formulation A) consisting of a solution of 50% corrosion inhibiting composition and 50% water.

EXAMPLE 2

A series of water-soluble corrosion inhibitors were produced following the method taught in Example 1. The first water-soluble corrosion inhibiting formulation (hereafter referred to as formulation B) was produced utilizing 47.5% by total weight of the reactants of the hydrolyzed acid anhydride, 18.5% by total weight of the reactants of AEEA, and 34.0% by total weight of the reactants of WMX-57F imidazoline. The second water-soluble corrosion inhibiting formulation (hereafter referred to as formulation C) was produced utilizing 50.2% by total weight of the reactants of the hydrolyzed acid anhydride, 22.7% by total weight of the reactants of AEEA, and 27.1% by total weight of the reactants of WMX-57F imidazoline. The third water-soluble corrosion inhibiting formulation (hereafter referred to as formulation D) was produced utilizing 53.3% by total weight of the reactants of the hydrolyzed acid anhydride, 27.6% by total weight of the reactants of AEEA, and 19.1% by total weight of the reactants of WMX -57F imidazoline. Each of these formulations consisted of a solution of 50% deionized water and 50% corrosion inhibiting composition.

EXAMPLE 3

The water-soluble corrosion inhibiting formulations of Examples 1 and 2 were tested electrochemically by the linear polarization resistance method. This method is a commercial testing procedure wherein a computer software program measures the corrosion current of a metal as an external potential is applied. The 1018 carbon steel coupons (9.03 $cm^2$.[1.4 $in^2$]) employed functioned as the working, counter, and reference electrodes. Film persistency was determined throughout the test period by electronically measuring the respective corrosion rates of the coupons.

The testing procedure was conducted in one liter glass vessels charged with the various corrosion inhibiting formulations to be evaluated and a standard solution of 78 parts brine (synthetic sea salt at 41.953 g/L of water) and 22 parts paraffinic oil. The vessels were sealed with the electrodes submersed in the liquid. For a period of 16 hours the sealed vessels were continuously agitated (at a rate of 50 revolutions per minute), maintained at a temperature of 65.4° C., and subjected to an oxygen-free carbon dioxide acid gas sparge. The results are listed in Table I below.

TABLE I

Evaluation of Water-Soluble Corrosion Inhibiting Compositions

| FORMULATION (50% inhibitor) | PERCENT PROTECTION | | |
|---|---|---|---|
| (50% water) | 4 ppm | 6 ppm | 8 ppm |
| A | 79.8 | 90.4 | 93.8 |
| B | 34.7 | 52.9 | 62.2 |
| C | 56.5 | 80.7 | 89.7 |
| D | 44.5 | 55.5 | 63.0 |

The industry standard for effective corrosion inhibition is a measurement of at least 90% protection. However, as noted earlier the water-soluble corrosion inhibitors currently utilized by industry must be employed in dosages of around 50 to 100 ppm. As shown in Table I, even at a 50% dilution the evaluated water-soluble corrosion inhibiting compositions achieved equivalent protection with dosages of only 6 to 8 ppm. Moreover, these corrosion-inhibiting compounds exhibited the ability to quickly form protective films having excellent persistency characteristics.

EXAMPLE 4

A series of evaluations were conducted of formulation A utilizing the testing procedure of Example 3. Table II below shows the average results obtained for the tests measuring corrosion protection. Table III below contains the average results obtained for the tests measuring corrosion rates.

TABLE II

Evaluation of Film Persistency Protection

| FOR- | PERCENT PROTECTION | | | | | |
|---|---|---|---|---|---|---|
| | 5 ppm | | 10 ppm | | 20 ppm | |
| MULATION | HOURS | | | | | |
| (50% inhibitor) (50% water) | 2 Hours | 16 Hours | 2 Hours | 16 Hours | 2 Hours | 16 Hours |
| A | 94.6 | 71.2 | 96.9 | 96.9 | 99.6 | 99.9 |

TABLE III

Evaluation of Annual Rate of Corrosion

| FOR- | CORROSION RATE (in mils per year) | | | | | |
|---|---|---|---|---|---|---|
| | 5 ppm | | 10 ppm | | 20 ppm | |
| MULATION | HOURS | | | | | |
| (50% inhibitor) (50% water) | 2 Hours | 16 Hours | 2 Hours | 16 Hours | 2 Hours | 16 Hours |
| A | 10.00 | 53.00 | 6.00 | 6.00 | 0.70 | 0.15 |

As shown in Tables II and III, the evaluated water-soluble corrosion inhibiting compositions exhibited excellent film persistency and corrosion inhibition values. Moreover, these superior results were achieved utilizing corrosion inhibiting compositions which were both diluted by 50% and employed in extremely small dosages.

EXAMPLE 5

A series of evaluations were conducted utilizing the testing procedure of Example 3. In these appraisals a solution (hereafter referred to as formulation E) was created consisting of 50% of the corrosion inhibiting composition taught in Example 1, 25% isopropyl alcohol, and 25% deionized water prior to their addition to the testing vessels in order to evaluate the film persistency of the composition. Table IV below shows the average results obtained for the tests measuring corrosion protection. Table V below contains the average results obtained for the tests measuring corrosion rates.

TABLE IV

Evaluation of Film Persistency Protection

| FOR- | PERCENT PROTECTION | | | | | |
|---|---|---|---|---|---|---|
| MULATION | 5 ppm | | 10 ppm | | 20 ppm | |
| (50% inhibitor) | HOURS | | | | | |
| (25% alcohol) (25% water) | 2 Hours | 16 Hours | 2 Hours | 16 Hours | 2 Hours | 16 Hours |
| A | 94.5 | 69.2 | 98.9 | 99.4 | 99.5 | 99.9 |

TABLE V

Evaluation of Annual Rate of Corrosion

| FOR- | CORROSION RATE (in mils per year) | | | | | |
|---|---|---|---|---|---|---|
| MULATION | 5 ppm | | 10 ppm | | 20 ppm | |
| (50% inhibitor) | HOURS | | | | | |
| (25% alcohol) (25% water) | 2 Hours | 16 Hours | 2 Hours | 16 Hours | 2 Hours | 16 Hours |
| A | 9.5 | 53.0 | 2.5 | 2.0 | 1.0 | 0.2 |

As shown in Tables IV and V, the evaluated water-soluble corrosion inhibiting compositions exhibited excellent film persistency and corrosion inhibition values. Moreover, these superior results were achieved utilizing corrosion inhibiting compositions which were both diluted by 50% (in a solution of alcohol and water) and employed in extremely small dosages.

Many modifications and variations of the present invention will be apparent to one of ordinary skill in the art in light of the above teaching. It is understood therefore that the scope of the invention is not to be limited by the foregoing description but rather is to be defined by the claims appended hereto.

What is claimed is:

1. A water-soluble corrosion inhibiting composition comprising the chemical structure

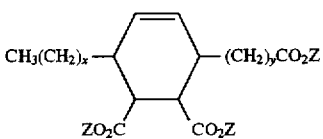

where: a) x+y=12; and b) Z is a neutralizing base selected from the group consisting of aminoethylethanolamine, imidazoline, amidoamine, and combinations thereof; wherein:

1) from 90.0% to 10.0% of the acid functionality of the $C_{22}$ tricarboxylic acid is neutralized by the $NH_2CH_2CH_2NHCH_2CH_2OH$ portion of Z; and 2) from 10.0% to 90.0% of the acid functionality of the $C_{22}$ tricarboxylic acid is neutralized by a member selected from the group consisting of

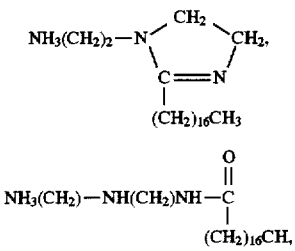

and combinations thereof.

2. The composition of claim 1 wherein:

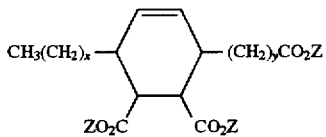

where: a) x+y=12; and b) Z is a neutralizing base selected from the group consisting of aminoethylethanolamine, imidazoline, amidoamine, and combinations thereof; wherein:

1) from 80.0% to 60.0% of the acid functionality of the $C_{22}$ tricarboxylic acid is neutralized by the $NH_2CH_2CH_2NHCH_2CH_2OH$ portion of Z; and 2) from 20.0% to 40.0% of the acid functionality of the $C_{22}$ tricarboxylic acid is neutralized by a member selected from the group consisting of

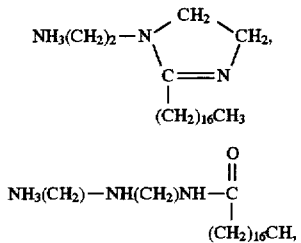

and combinations thereof.

3. A method for the production of a water-soluble corrosion inhibiting composition which comprises:

(1) reacting one or more $C_{18}$ unsaturated fatty acids with a member selected from the group consisting of maleic anhydride, fumaric acid, and combinations thereof to produce a $C_{22}$ tricarboxylic acid; and (2) neutralizing said $C_{22}$ tricarboxylic acid with aminoethylethanolamine and a member selected from the group consisting of imidazoline, amidoamine, and combinations thereof to produce a water-soluble corrosion inhibiting composition comprising the chemical structure

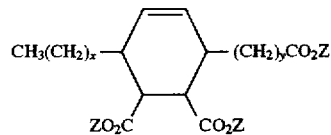

where: a) x+y=12; and b) Z is a neutralizing base selected from the group consisting of aminoethylethanolamine, imidazoline, amidoamine, and combinations thereof; wherein:

1) from 90.0% to 10.0% of the acid functionality of the $C_{22}$ tricarboxylic acid is neutralized by the $NH_2CH_2CH_2NHCH_2CH_2OH$ portion of Z; and 2) from 10.0% to 90.0% of the acid functionality of the $C_{22}$ tricarboxylic acid is neutralized by a member selected from the group consisting of

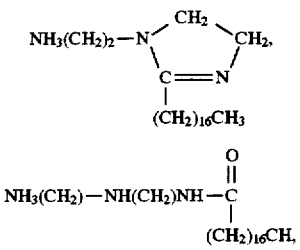

and combinations thereof.

4. The method of claim 3 wherein the $C_{22}$ tricarboxylic acid is neutralized with aminoethylethanolamine and a member selected from the group consisting of imidazoline, amidoamine, and combinations thereof to produce a water-soluble corrosion inhibiting composition comprising the chemical structure

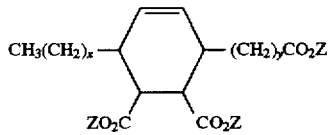

where: a) x+y=12; and b) Z is a neutralizing base selected from the group consisting of aminoethylethanolamine, imidazoline, amidoamine, and combinations thereof; wherein:

1) from 80.0% to 60.0% of the acid functionality of the $C_{22}$ tricarboxylic acid is neutralized by the $NH_2CH_2CH_2NHCH_2CH_2OH$ portion of Z; and 2) from 20.0% to 40.0% of the acid functionality of the $C_{22}$ tricarboxylic acid is neutralized by a member selected from the group consisting of

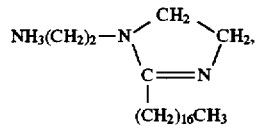

-continued

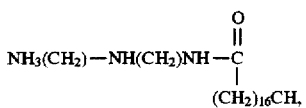

and combinations thereof.

5. The method of claim 3 wherein 100 parts by weight of the $C_{22}$ tricarboxylic acid is neutralized with (1) from 6.00 to 60.00 parts by weight of aminoethylethanolamine, and (2) from 13.0 to 175.0 parts by weight of member selected from the group consisting of imidazoline, amidoamine, and combinations thereof to produce the water-soluble corrosion inhibiting composition.

6. A method for inhibiting metal corrosion comprising coating said metal with a water-soluble corrosion inhibiting composition having the chemical structure

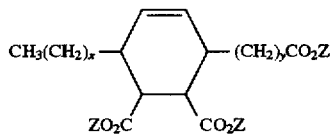

where: a) x+y=12; and b) Z is a neutralizing base selected from the group consisting of aminoethylethanolamine, imidazoline, amidoamine, and combinations thereof, wherein:
1) from 90.0% to 10.0% of the acid functionality of the $C_{22}$ tricarboxylic acid is neutralized by the $NH_2CH_2CH_2NHCH_2CH_2OH$ portion of Z; and
2) from 10.0% to 90.0% of the acid functionality of the $C_{22}$ tricarboxylic acid is neutralized by a member selected from the group consisting of

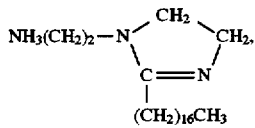

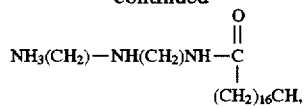

and combinations thereof.

7. The method of claim 6 wherein said water-soluble corrosion inhibiting composition has the chemical structure where: a) x+y=12; and b) Z is a neutralizing base selected from the group consisting of aminoethylethanolamine, imidazoline, amidoamine, and combinations thereof; wherein:
1) from 80.0% to 60.0% of the acid functionality of the $C_{22}$ tricarboxylic acid is neutralized by the $NH_2CH_2CH_2NHCH_2CH_2OH$ portion of Z; and
2) from 20.0% to 40.0% of the acid functionality of the $C_{22}$ tricarboxylic acid is neutralized by a member selected from the group consisting of

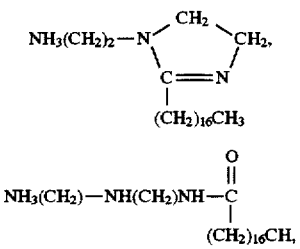

and combinations thereof.

8. The method of claim 6 wherein the water-soluble corrosion inhibiting composition is dispersed in a carrier solvent.

9. The method of claim 8 wherein the carrier solvent is selected from the group consisting of water, alcohol, and combinations thereof.

10. The method of claim 7 wherein the water-soluble corrosion inhibiting composition is dispersed in a carrier solvent.

11. The method of claim 10 wherein the carrier solvent is selected from the group consisting of water, alcohol, and combinations thereof.

* * * * *